United States Patent [19]

Honda et al.

[11] Patent Number: 4,838,238

[45] Date of Patent: Jun. 13, 1989

[54] INTERNAL PERIPHERAL EDGE TYPE BLADE HOLDING DEVICE

[75] Inventors: Katsuo Honda; Susumu Sawafuji; Tomio Tomita, all of Mitaka, Japan

[73] Assignee: Tokyo Seimitsu Co., Ltd., Tokyo, Japan

[21] Appl. No.: 212,056

[22] Filed: Jun. 27, 1988

[30] Foreign Application Priority Data

May 23, 1988 [JP] Japan ................. 63-125359

[51] Int. Cl.$^4$ ............................. B28D 1/04
[52] U.S. Cl. ................... 125/15; 125/13 R
[58] Field of Search ............ 125/15, 13 R, 12; 30/388; 83/481, 489, 491, 508.2

[56] References Cited

U.S. PATENT DOCUMENTS 4,637,369  1/1987  Petermann et al. ............. 125/15
4,716,881  1/1988  Steere ......................... 125/15

Primary Examiner—Frederick R. Schmidt
Assistant Examiner—Maurina Rachuba
Attorney, Agent, or Firm—Oliff & Berridge

[57] ABSTRACT

An internal peripheral edge type blade holding device for use in an internal peripheral edge type slicing machine used when a silicone ingot is sliced into thin pieces each having a thickness of the order of several hundred microns in a semiconductor manufacturing process. In the blade holding device, a head assembly for stretching and holding an internal peripheral edge blade is supported to a rotary plate through 4 plate springs spaced at 90° intervals. Accordingly, when stretching the internal peripheral edge blade, even if the tension assembly is deformed because of the anisotropic property of the blade, such deformation can be absorbed by the plate springs and thus is not transmitted to the rotary plate, so that the swaying of the edge of the internal peripheral edge blade can be prevented in cutting the ingot.

7 Claims, 6 Drawing Sheets (X DIRECTION)

(Y DIRECTION)

(X DIRECTION)

(Y DIRECTION)

INTERNAL PERIPHERAL EDGE TYPE BLADE HOLDING DEVICE

BACKGROUND OF THE INVENTION

1. Field of the Invention

The present invention relates to an internal peripheral edge type blade holding device for use in an internal peripheral edge type slicing machine used when a fragile material such as a silicone ingot is sliced into thin pieces each having a tickness of the order of hundreds of microns.

2. Description of the Related Art

In general, a thin piece such as a semiconductor wafer is manufactured by slicing an ingot of a semiconductor or the like by use of a very thin cutting blade. As a typical example of such cutting blade, there is available a doughnutshaped blade and, especially, there is often used a blade provided with an internal peripheral edge which can be contructed by adhesively attaching diamond ground particles to the internal peripheral edge of the blade. In such internal peripheral edge type blade, in order to slice out a thin piece with a high accuracy, the external peripheral side of the blade is tensioned up and held by a blade holding device by means of a predetermined tension so as to be able to give the blade a predetermined tensile force.

Referring now to FIG. 7, there is shown a side section view of an internal peripheral edge type blade holding device H which is conventionally used. In this figure, there is shown a spindle 1, a bowl-shaped bottom ring 2 is fixedly mounted to the upper portion of the spindle 1, and a tension ring 3 is mounted to the top portion of the bottom ring 2. The blade, which is here designated by B, is put between and held by the tension ring 3 and a top ring 4 which can be mounted onto the tension ring 3 by means of bolts or the like.

According to a conventional well known method, the tension of the blade B can be adjusted by a large number of blade set bolts (not shown) which are provided on the circumference of the top ring 4. Such tension adjustment method is based on the existence of differences among the degrees of tensile strength with respect to the rolling direction, that is, an anisotropic property inherent in the blade B. In other words, due to the fact that the doughnutshaped blade is produced by press punching a rolled, stripshaped thin plate, the blade has no directional property because it is circular in appearance, but, however, in the blade, inherently, there is produced a difference in tensile strength between in the rolling direction and a direction intersecting perpendicularly with the rolling direction. For this reason, in the above-mentioned blade tension adjustment method, the pressing forces of the set bolts on the top ring circumference are set to vary according to positions.

In other words, since, as mentioned above, the above-mentioned anisotropic property is found to exist in between the directions ( x-x direction, y-y direction ) which intersect substantially with each other, for example, if the tensile strength in the x direction is greater than that in the y direction, the pressing force in the x direction may be set greater than that in the y direction.

However, if the pressing forces are set to be different according to the positions of the blade as mentioned above, then uneven stress loads are given to the whole holding device H, which, in the end, may result in the sway of the blade in cutting, breakage or damage of a sliced thin piece, varying thicknesses of the sliced thin pieces, and other similar unfavorable phenomena.

In FIGS. 8 and 9, there is shown a state of the above-mentioned holding device H deformed due to the above-mentioned stress. Specifically, in these figures, a solid line is used to illustrate the shape of the blade holding device H before the stress loads are applied thereto, while a two-dot chained line is used to illustrate the shape of the blade holding device H after the stress loads are applied thereto.

In other words, in these figures, when the pressing force in the x direction side of the blade B is set greater than that in the y direction thereof as mentioned above, then a similar load, as the reaction force thereof, is produced in the blade holding device H. In this case, a tension head assembly 5, which is composed of the top ring 4 and tension ring 3 of the holding device, is displace, when viewed in the plane shape thereof, inwardly in the x direction and outwardly in the y direction thereof, so that the tension head assembly 5 turns into an elliptical shape, as shown by the two-dot chained line in FIG. 8. Such deformation of the tension head assembly 5 has an effect on the bowl-shaped bottom ring 2 as well. That is, because the tension head assembly 5 has a ring-like shape, it provides the elliptical shape when it is deformed, but, however, the bottom ring 2 cannot be deformed into such elliptical shape as mentioned above due to the existence of a bottom plate 6. For this reason, as shown in FIG. 9, in the x direction (the shorter diameter direction) of the bottom ring 2 the peripheral side of the bottom plate is curvedly deformed in the upward direction, while in the y direction (the longer diameter direction ) of the bottom ring 2 the peripheral side of the bottom plate is curvedly deformed in the downward direction. The deformation of the bottom plate as it is, has an influence on the tension head assembly 5. As described above, while the plane shape of the tension head assembly 5 is deformed into the elliptical form due to the stress loads, the side face shape of the tension head assembly 5 is deformed in an arc-like manner with the abovementioned bottom plate peripheral side as a fulcrum because the deformation of the bottom plate 6 has an influence thereon. That is, as shown in the illustrated embodiment, when viewed from the x direction, the blade surface is deformed in the upward direction from the normal level thereof, while, when viewed from the y direction, the blade surface is deformed in the downward direction, so that the whole blade surface provides an uneven shape like a swell. This disadvantageously results in the sway of the surface of the bottom plate 6 as well as in the sway of the edge of the blade in cutting.

SUMMARY OF THE INVENTION

The present invention aims at eliminating the drawbacks found in the above-mentioned prior art blade holding device.

Accordingly, it is an object of the invention to provide a blade holding device with the edge thereof free from swaying.

In order to attain the above object, according to the invention, there is provided a blade holding device which comprises: a rotary plate fixedly mounted to a spindle shaft; a tension head assembly; a plurality of plate springs respectively erected on the rotary plate at different positions thereof and flexible in the radial direction thereof; a tension head assembly supported by the plate springs; an internal peripheral edge blade tensioned up and held by the tension head assembly and positioned in connection with the plate springs in consideration of an anisotropic property.

In the present invention, the different direction portions (x, y direction portions) of the internal peripheral edge blade are made to coincide with the positions of the plate springs on the rotary plate and, in this condition, the blade is stretched with a desired pressing force. Due to this stretching, in the different direction portions of the blade, the tension in the x direction is different from that in the y direction. That is, for example, if the tension in the x direction is greater than the tension in the y direction, then the tension head assembly is deformed shorter in diameter in the x direction, while the assembly is deformed longer in diameter in the y direction. Such deformations of the tension head assembly can be absorbed by the plate springs, so that such deformations are not transmitted to the rotary plate which forms the bottom plate of the holding device. As a result of this, according to the invention, it is possible to prevent the generation of swaying of the edge of the internal peripheral edge type blade due to the deformation of the rotary plate.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of an internal peripheral edge type blade holding device according to the present invention with reference to the accompanying drawings.

Figure 1:
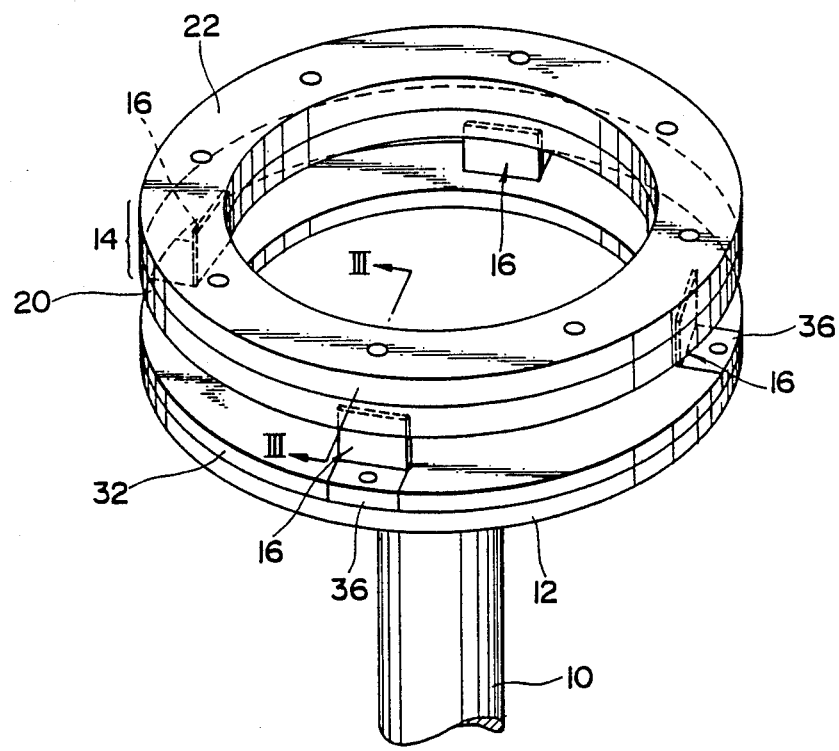
FIG. 1 is a perspective view of the whole shape of an internal peripheral edge type blade holding device according to the invention.

Referring first to FIG. 1, there is shown the whole shape of an internal peripheral edge type blade holding device according to the present invention, in which the upper end of a spindle shaft 10 connected to a rotary drive source (which is not shown) is connected to the central portion of a rotary plate 12. The rotary plate 12 is connected with a tension head assembly 14 by means of 4 plate springs 16, 16, 16, 16 (in FIG. 1, only three of them are shown) spaced at 90° intervals from one another.

Also, the tension head assembly 14 is composed of a tension ring 20 and a top ring 22 which are connected to each other by means of bolts (not shown). In the tension head assembly 14, a blade 32 to be described later is interposed between the tension ring 20 and top ring 22 and, in this condition, a bolt 30 (which will be described later) is tightened to thereby give tension to the blade 32 which is provided with an internal peripheral edge 32A.

Figure 3:
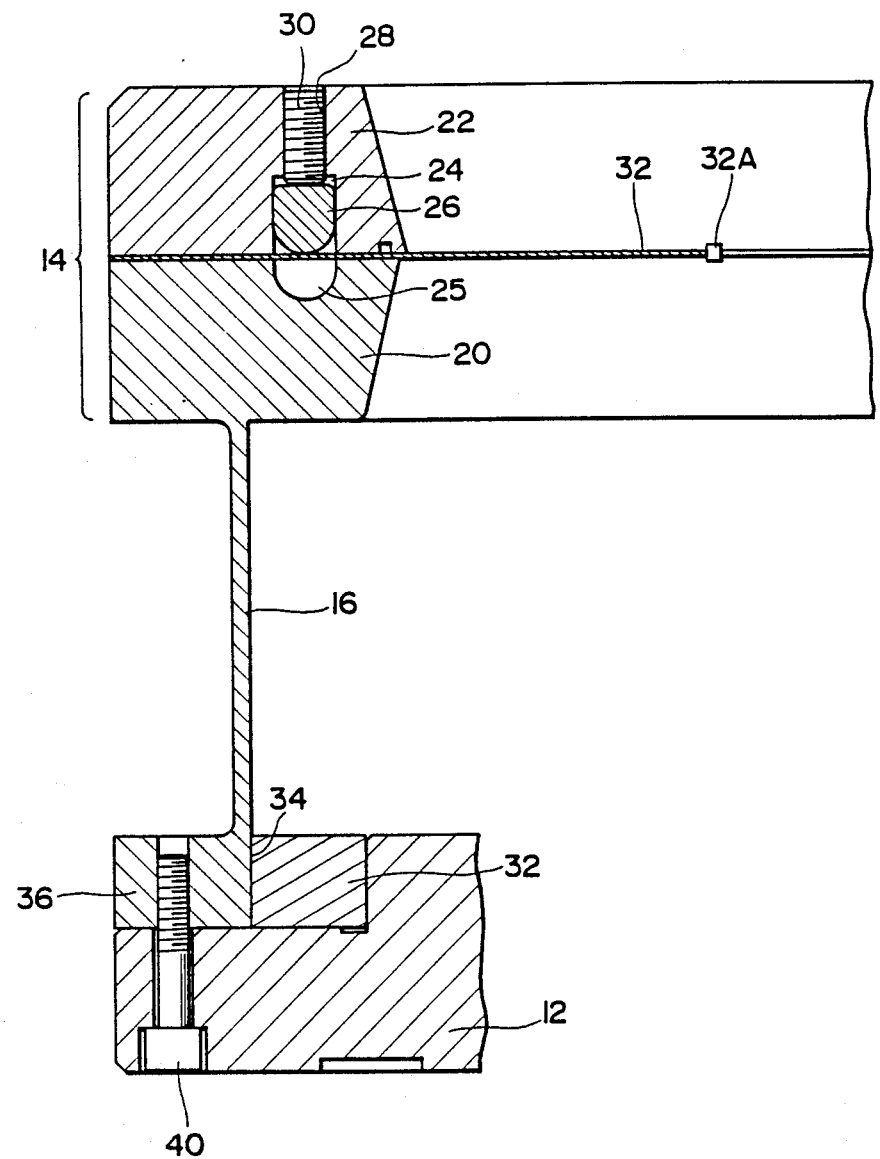
FIG. 3 is a section view taken along the line III—III in FIG. 1, illustrating how a plate spring is mounted.

In FIG. 3, there is shown a section view taken along the line III—III in FIG. 1, which illustrates a structure for mounting the plate spring 16. The tension ring 20 and top ring 22 are positioned by use of knock pins (not shown), respectively. Also, in the lower surface of the top ring 22 there is formed a ring-shaped groove 24 in which a press ring 26 having a substantially U-shaped section is loosely inserted in a vertically movable manner. On the other hand, on the upper surface of the tension spring 20, there is formed a ring-shaped groove 25 which corresponds to the above-mentioned ring-shaped groove 24. The groove 25 is formed in such a manner that the lower portion of the press ring 26 can be fitted into the groove 25. Further, in the ring-shaped groove 24, there is formed a tapped hole 28 extending from the upper surface of the top ring 22, into which hole 28 there is screwed the bolt 30. For this reason, if the bolt 30 is tightened, then the press ring 26 is pressed downward toward the ring-shaped groove 25, whereby tension can be given to the blade 32 interposed between the top ring 22 and tension ring 20.

Figure 2:
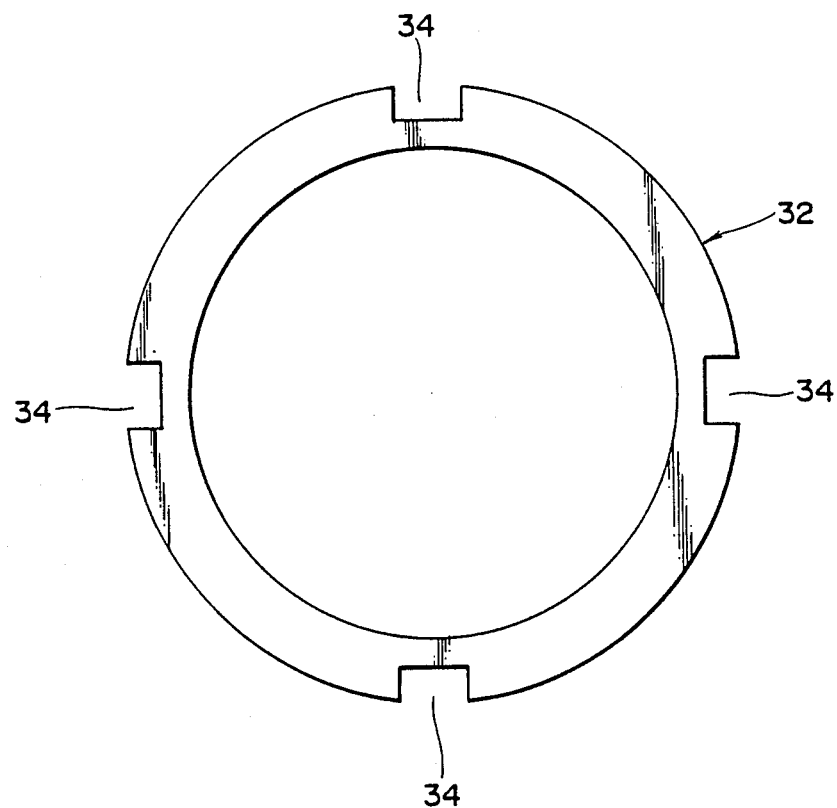
FIG. 2 is a plan view of a ring formed with recesses.

Also, the above-mentioned plate spring 16 is formed integrally with the tension ring 20. In other words, the plate spring 16 is formed integrally with the tension ring 20 and is extended down from the lower portion of the tension ring 20, so that the portion of the plate spring 16 has a resilient property. Next, description will be given of a structure for mounting the lower end of the plate spring 16 in connection with FIG. 3. A ring 32 formed on the external peripheral edge thereof with 4 recesses 34 spaced at 90° intervals from one another, as shown in FIG. 2, is fixedly mounted onto the upper surface of the rotary plate 12 by means of bolts (not shown). The lower base portion 36 of the plate spring 16 is fitted into the recesses 34 of the ring 32 and is then fixedly mounted thereto by means of a bolt 40. As described before, the plate springs 16 are provided spaced at 90° intervals from one another and they are arranged such that they can be flexed in the radial direction of the rotary plate 12. Before the tension head assembly 14 is mounted, the plate spring 16 can be deformed in the radial direction of the rotary plate 12.

Figure 4:
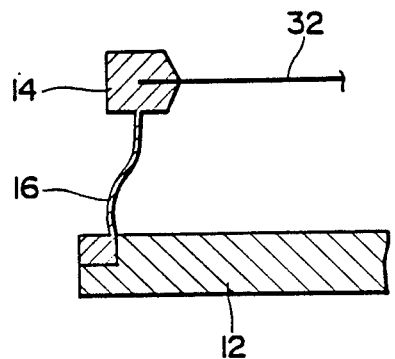
FIGS. 4 and 5 are respectively side views to illustrate the deformed states of the blade holding device.
Figure 5:
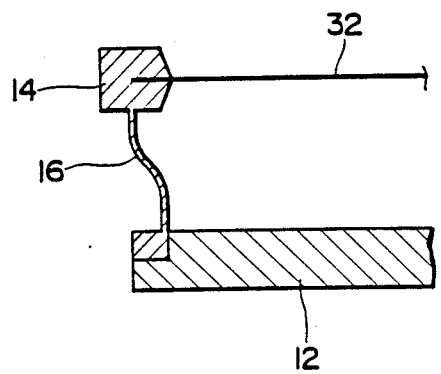

Now, description will be given below of the operation of the embodiment of the invention constructed in the abovementioned manner. When stretching and setting the internal peripheral edge type blade 32, the internal peripheral edge type blade 32 is placed onto the upper surface of the tension ring 20 which is located on the four plate springs 16, 16, 16, 16. In this case, if the two different directions of the blade 32 are expressed by, for example, x and y, respectively, then the blade may be placed in such a manner that the x- and y-direction lines of the blade are made to coincide with the plate springs 16, 16. After then, the top ring 22 is placed over the tension ring 20 and is fastened to the tension ring 20 by means of bolts which are known means, with the blade 32 held therebetween, and at the same time the ring 20 is pressed by means of the blade set bolt 30, whereby a desired intensity of tension is given to the blade 32. The pressing forces of the bolt 30, as described before, are different in the x, y direction of the blade 32. Accordingly, for example, if the tensile strength in the x direction is greater than that in the y direction, then the pressing force of the bolt in the x direction must be set greater than that in the y direction. As a result of this, the tension in the x direction becomes greater than that in the y direction and the reaction force thereof is naturally greater in the x direction, that is, such a stress is given to the tension head assembly 14 that can make the x-direction diameter of the tension head assembly 14 shorter than the y-direction diameter thereof. When the stress load is greater than the rigidity of the tension head assembly 14, then the tension head assembly 14 is displaced in such a manner that the x-direction diameter thereof is shorter (FIG. 4) while the y-direction diameter thereof is longer (FIG. 5). This displacement has effects on the plate springs 16. The plate springs 16, as shown in FIGS. 4 and 5, are arranged such that they are displaceable in the radial direction of the rotary plate 12 and, accordingly, the springs 16 are displaced in response to the above-mentioned diameter displacements of the tension head assembly 14. For this reason, the displacement and stress resulting from the stretching of the blade 32 have little influence on the rotary plate 12, irrespective of the tension of the blade 32.

Also, it is true that the diameter displacement of the tension head assembly 14, as in the before-described prior art device, has effects on the height of the blade 32 as well, but, according to the present invention, the rotary plate 12 is not displaced and thus there is produced no accumulation of the displacements of the rotary plate 12, so that the displacement of the blade height becomes the value corresponding to the angle of displacement of the spring 16. Actually, the height displacement of the blade can be controlled at several microns at the utmost. That is, such degree of the blade height displacement is so small that the quality of a work material cannot be degraded due to swaying of the edge of the blade when it is rotated. It can be said that such degree of the height displacement can produce no swaying of the blade edge substantially.

Further, according to the above-mentioned structure, on the rotary plate 12 there are erected only the plate springs 16 and, therefore, waste matters such as cut powder, cut water and the like produced when the work material is cut by the blade can be discharged out speedily from spaces among the plate springs 16 into the outside.

As has been described hereinbefore, according to the invention, when there is produced the diametral direction displacement of the tension head assembly resulting from the anisotropic property of the internal peripheral edge type blade, such displacement can be absorbed by the plate springs and is not transmitted to the rotary plate, so that the rotary plate cannot be displaced due to the stretching and setting of the blade. As a result of this, there can be eliminated the height displacements of the internal peripheral edge blade, that is, the swell-like uneven shapes of the blade surface due to the displacements of the rotary plate as in the conventional devices and also the swaying of the blade edge due to the blade height displacement can be prevented.

Figure 6:
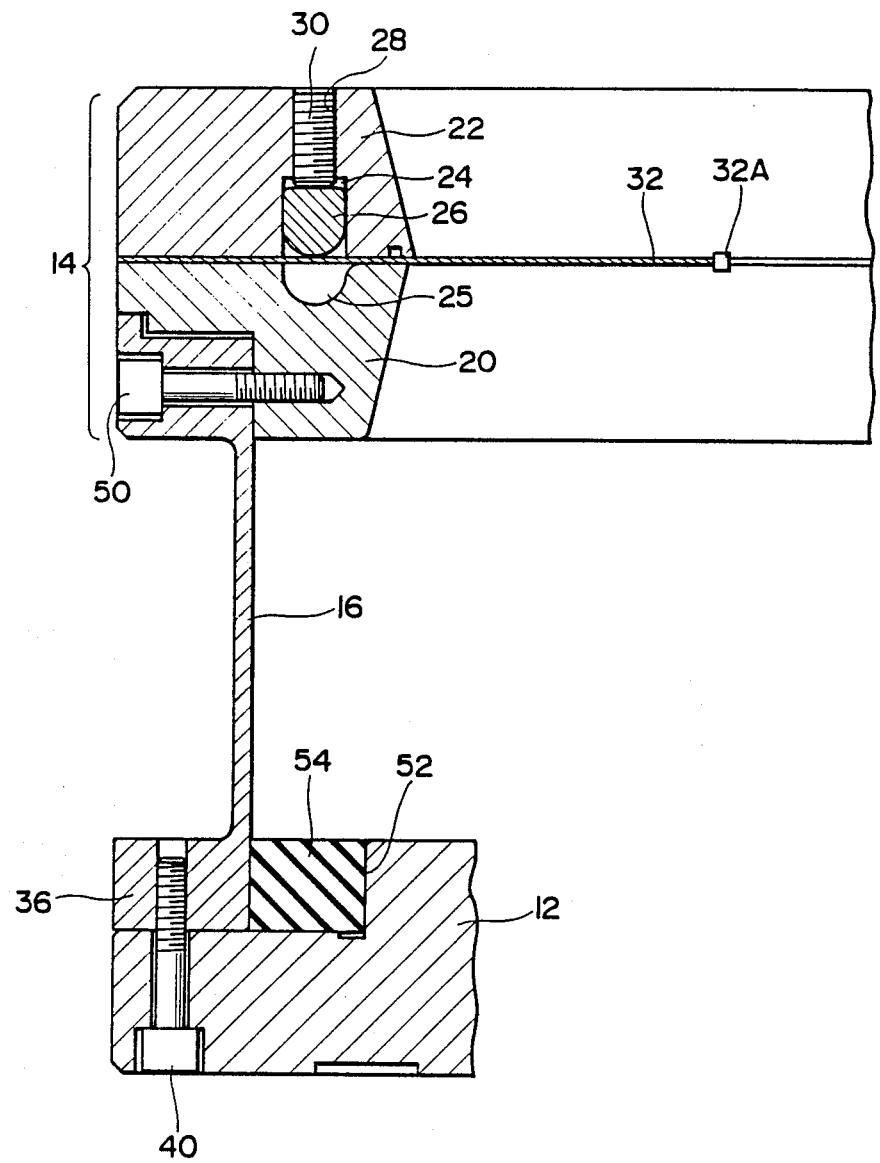
FIG. 6 is a section view of another embodiment of an internal peripheral edge type blade holding device according to the invention.
Figure 7:
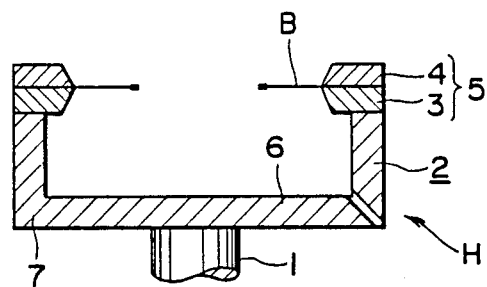
FIG. 7 is a side view to illustrate the structure of an internal peripheral edge type blade holding device according to the prior art.
Figure 8:
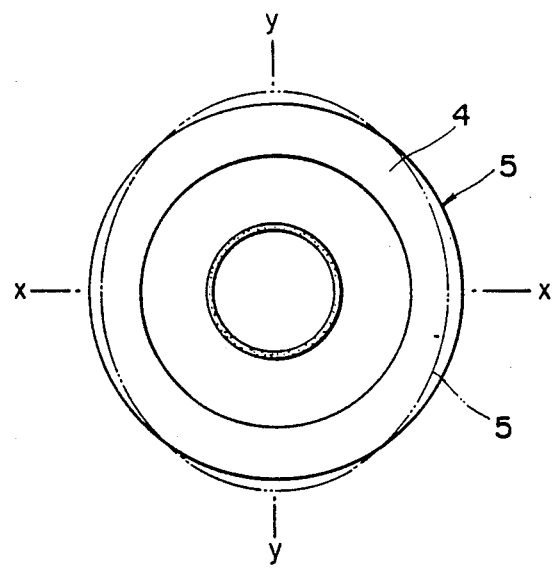
FIG. 8 is a plan view to illustrate the displacement of a tension head assembly caused by stretching a blade; and, FIGS. 9(A), (B) are respectively side views to illustrate the displaced states of the blade holding device.
Figure 9A:
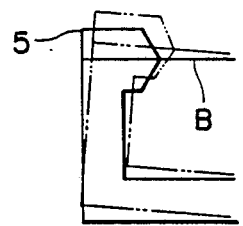
Figure 9B:
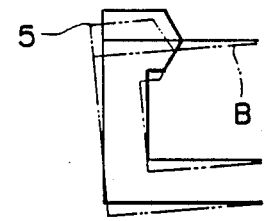

Further, in the illustrated embodiment, the tension ring 20 and plate spring 16 are formed integrally with each other, but, however, as shown in FIG. 6, the plate spring 16 and tension ring 20 may also be formed separately from each other and the plate spring 16 may then be mounted to the tension ring 20 by means of bolts 50 or the like. In another embodiment shown in FIG. 6, there are formed recesses 52 spaced at 90° intervals on the upper surface of the rotary plate 12, as in the ring 32 shown in FIG. 2. The lower end base portion 36 of the plate spring 16 is fitted into the recess 52 by means of urethane rubber 54.

In the above-mentioned embodiments, the description has been given on the assumption that the number of the plate springs is four, but the invention is not limited to this. That is, the number of the plate springs is not limited to four, provided that the displacement of the tension head assembly is not transmitted to the rotary plate.

It should be understood, however, that there is no intention to limit the invention to the specific forms disclosed but on the contrary, the invention is to cover all modifications alternate constructions and equivalents falling within the spirit and scope of the invention as expressed in the appended claims.

What is claimed is:

1. An internal peripheral edge type blade holding device comprising:
   a rotary plate fixedly mounted to a spindle shaft;
   a plurality of resilient pieces located on said rotary plate, spaced at regular intervals from one another in the circumferential direction of said direction of said rotary plate and respectively displaceable in the radial direction of said rotary plate;
   a tension head assembly supported by said resilient pieces on said rotary plate; and,
   an internal peripheral edge blade stretched and held by said tension head assembly.

2. An internal peripheral edge type blade holding device as set forth in claim 1, wherein said resilient pieces are plate springs.

3. An internal peripheral edge type blade holding device as set forth in claim 2, wherein said plate springs are located at 90° intervals from one another and the anisotropic property of said internal peripheral edge blade is made to correspond to the positions of said plate springs.

4. An internal peripheral edge type blade holding device as set forth in claim 3, wherein said tension head assembly comprises a tension ring and a top ring and said internal peripheral edge blade is stretched and held by said tension and top rings.

5. An internal peripheral edge type blade holding device as set forth in claim 3, wherein each of said plate springs is formed integrally with said tension ring and suspended down from the lower surface of said tension ring.

6. An internal peripheral edge type blade holding device as set forth in claim 5, wherein on said rotary plate there is fixedly mounted a ring with recesses which is formed in the outer periphery thereof with the same number of recesses as that of said plate springs, and the lower end portions of said plate springs are respectively fitted into said recesses and fastened to said recesses by means of bolts.

7. An internal peripheral edge type blade holding device as set forth in claim 3, wherein the upper end of each of said plate springs is connected to said tension ring by means of a bolt while the lower end thereof is connected to said rotary plate by means of a bolt.

* * * * *